PLATED WIRE MEMORY EMPLOYING A MAGNETICALLY SATURABLE SHIELD

Filed June 16, 1965

INVENTOR
WILLIAM J. BARTIK

BY William E. Cleaver
ATTORNEY

United States Patent Office 3,422,410
Patented Jan. 14, 1969

3,422,410
PLATED WIRE MEMORY EMPLOYING A MAGNETICALLY SATURABLE SHIELD

William J. Bartik, Jenkintown, Pa., assignor to Sperry Rand Corporation, New York, N.Y., a corporation of Delaware Filed June 16, 1965, Ser. No. 464,283
U.S. Cl. 340—174 6 Claims
Int. Cl. G11b 5/00

This invention relates to thin-film magnetic memory devices and, in particular, to a coincident current plated wire memory.

Heretofore plated wire memories have been arranged in the word organized mode because it has been relatively easy to accomplish both a "write-in" and a "read-out" cycle. However, it has not been easy with a plated wire memory to effect a read-out in the coincident current mode. The foregoing has not proven to be a series detriment to the utility or the popularity of plated wire memories, since word organized memories do provide the advantage of less "half-switching" noise, and very often, faster switching speeds, due to the ability to overdrive the memory elements.

Nonetheless, in certain applications it is desirable to have a coincident current memory arrangement because coincident current arrangements require less components to effect their operation than do word organized memories. This can be readily understood if we consider simply a hundred word memory with ten bits per word. In our hypothetical we would need, for a word organized memory, twenty drivers to accomplish the XY selection, ten more drivers to accomplish the bit selection and some one hundred diodes, or other threshold elements, to work in conjunction with the XY selection. On the other hand, in a coincident current memory the threshold phenomenon is accomplished by the memory element itself and hence for a hundred word memory with ten bits per word we need only have twenty drivers to accomplish the XY selection and ten drivers to accomplish the bit selection.

The present invention provides a means for accomplishing a coincident current operation of a plated wire memory, as will be more fully described hereinafter.

Accordingly, it is an object of the present invention to provide an improved coincident current type memory device.

It is a further object of the present invention to provide a coincident current memory device employing thin film magnetizable memory elements.

In accordance with a feature of the present invention, there is provided a magnetizable thin-film, plated-wire memory which has a magnetically saturable shield disposed between it and the drive lines which normally accompany such a plated wire memory.

In accordance with another feature of the present invention, the magnetically saturable eddy-current shield, mentioned in connection with the feature above, is tubular shaped to surround the plated wire memory element and is connected to a signal source which transmits a signal therealong to cause said shield to become selectively saturated and unsaturated for the purpose of respectively allowing flux to pass therethrough or be intercepted thereby.

In accordance with another feature the eddy-current shield material is chosen such that the flux which passes therethrough can be effectively passed therethrough in a very short period of time.

The above-mentioned and other features and objects of this invention will become more apparent by reference to the following description taken in conjunction with the accompanying drawings wherein.

Figures 1, 2:
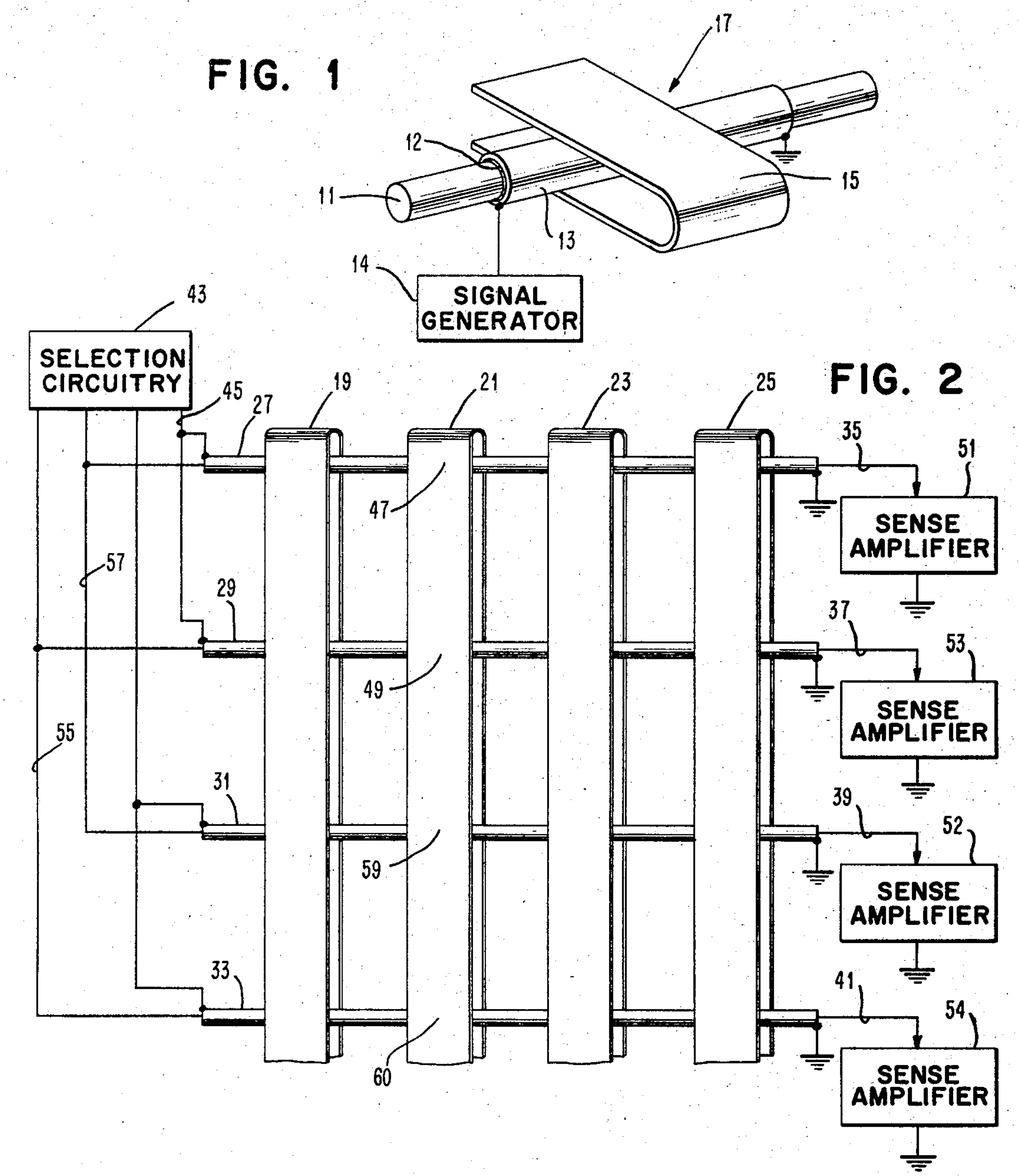
FIGURE 1 is a pictorial schematic of a memory location defined by the plated wire, the eddy-current shield, and the word strap.
FIGURE 2 is a schematic showing a plurality of storage positions for the present memory.

In general, the present invention operates in such a manner that coincidence is effected at a particular memory location by energizing the shield and the drive strap which define the memory location. Such an operation is in effect the procedure of selecting the X and Y positions of the storage location which is either to be read out of or written into. When the eddy-current shield is subjected to a current it becomes magnetically saturated and allows the flux from the drive strap to almost instantaneously pass through the shield, with virtually no energy loss, and subsequently provide a switching operation on the plated wire memory position. At the same time all of the memory positions, whose associated shields have not been energized, do not have their respective plated wires subject to the flux from the drive lines and accordingly there is no switching on these plated wire locations.

Consider FIGURE 1 which shows a storage position which is defined by the plated wire memory 11, the magnetically-saturable eddy-current shield 13, and the drive line 15. Between the plated wire 11 and the shield 13 there is placed a thin layer of electrical insulation 12. The plated wire memory element 11 comprises an inner-core of beryllium copper around which there is plated ten thousand angstroms of permalloy film (a metal film comprising approximately 80% iron and 20% nickel). The permalloy film is plated to the beryllium copper core while being subjected to a D.C. circumferential magnetic field so as to provide the film with the property of uniaxial anisotropy. Hence, the plated wire memory is characterized at each memory location with the capacity of being magnetized circumferentially around the wire, along the "easy" axis, and alternatively at each memory position, parallel to the wire itself, along the hard axis. The eddy-current shield 13 can be made of a nickel-iron compound which is electrically conductive and readily magnetically saturable. In the preferred embodiment Mu metal (an unoriented 79% Ni-Fe-Mo alloy) is employed. The drive line 15 can be made of any good electrical conductor, which has a backing of an electrical insulation material, in order to electrically isolate the drive line from the shield. In the preferred embodiment the drive line 15, along with other similar drive lines, are printed on a flexible insulating material, such as Mylar or some other polyester and are formed in the "bendaround" mode as shown in FIGURE 1. Further shown in FIGURE 1 is a signal generator 14 which provides an electrical signal to saturate shield 13. It should be understood that the dimensions of the components in FIGURE 1 are exaggerated for purposes of illustration.

The memory location 17 which is identified by the plated wire element 11, the eddy-current shield 13 and the drive line 15 is capable of storing data information on the plated wire element 11 under location 17. When information is to be read out of location 17, in particular as stored on element 11, the eddy-current shield 13 is subjected to current flow which magnetically saturates it, and permits the flux that is generated by the current flowing in drive line 15 to pass through the eddy-current shield and rotate the magnetic vectors of the plated wire 11, at location 17, toward the hard axis. The rotation of the vectors provide a read-out by inducing a current signal on the beryllium copper core of the plated wire 11.

Consider FIGURE 2 which shows a plurality of word straps 19, 21, 23 and 25 which over-lie the eddy-current shields 27, 29 31 and 33. Threaded through the hollow shields 27, 29, 31 and 33 are respectively the plated wire elements 35, 37, 39 and 41. Circuitry connections shown at the left-hand side of FIGURE 2 connect the eddy-current shields 27, 29, 31 and 33 to selection circuitry means 43. In addition, the plated wire memories 35, 37, 39 and 41 are also connected to the selection circuitry 43. The selection circuitry 43 may be any one of the well known diode or resistor switching matrices, or data storage registers with properly "AND-gated" outputs, which would enable the selection of the input leads to both the plated wire devices and the eddy-current shields. The internal operation of such a selection circuit 43 is well known and need not be described in this specification.

It should be noted that the particular configuration of the circuitry which is connected to the eddy-current shields and to the plated wire memories need not be as it is shown in FIG. 2 and will yet be within the spirit of the present invention. In FIGURE 2 the two shields, 27 and 29, are connected so that they are energized at the same time. Hence, a signal on line 45 and a simultaneously generated signal on drive line 21 would provide a read-out of information at memory locations 47 and 49. The induced read out signals would be transmitted on the plated wire memory lines 35 and 37, respectively, to the sense amplifiers 51 and 53. It should be noted that the eddy-current shields could be connected separately so that only one of the positions would be read out, either 47 or 49, or, alternatively, all of the current shields could be connected so that all four positions 47, 49, 59 and 60 would be read out at one time. It should also be noted that the sense amplifiers might be scanned at different times to only read certain of the sense amplifiers.

During a write-in either write-sense line 55 or 57, which are connected to the plated wire elements, is energized simultaneously with a drive line to effect a write-in, in the manner which is normally accomplished with a plated wire memory. However, at this same time, the eddy-current shield must also be energized, otherwise the write-in will not be effected. For instance, if there is to be a write-in accomplished at position 47, the eddy-current shield line 45 would be energized and the write-sense line 57 would be energized. The foregoing energization would cause shield 27 to be saturated so that the flux from drive line 21 would cause a partial switching action of the plated wire element 35 at position 47. The further energization of plated wire element 35 would complte the switching action at location 47 to effect a "write-in."

It should be noted, during the last operation, that all of the eddy-current shields 29 have been saturated and therefore the flux from the drive line 21 is permitted to partially rotate the vectors of line 37. The fact that line 55 had not been energized does not cause a write-in at position 49. At the same time, the eddy-current shield 31 is not being energized and so even though the plated wire element 39 is energized, the flux from the drive line 21 cannot combine with the flux generated by the signal on line 39 to effect a write-in at position 59.

It should be understood that it would be possible, with a sufficient amount of power applied for a sufficiently long time, to saturate an eddy-current shield at a memory location with the flux from a drive line and ultimately effect either a write-in or a read-out of the information on a plated wire memory. However, it has become obvious from the foregoing statement that in order to accomplish this type of operation a great deal of power is required and a relatively long time is required. With respect to using this last-described technique in the present state of the art of data processing, not only would the power requirement be a severe limitation but more importantly the time requirement would be a prohibitive limitation. The provision of the saturable eddy-current shield enables the read-out and write-in information to take effect in a very short time with a relatively small amount of power consumption.

Let us examine the mathematical analysis of the components involved with respect to the time required to effect a "passing through" of the flux from the drive line to the plated wire element.

It can be reasonably assumed that the time constant related to magnetic field penetration into a solid cylinder can also be used wih an expression for a hollow cylinder. Hence the following expression can be employed:

$$H_z=H_o=\frac{2H_o}{a}\sum_{s=1}^{s=0}\frac{(\epsilon^{-K\alpha_s 2t})(J_o^{(\alpha_j r)})}{\alpha_s J_o(\alpha_s a)}$$

where:
$H_z$=magnetic field in material
$H_o$=incident magnetic field (from drive strap)
$d$=radius of cylinder
$r$=field at any radius within cylinder
$\alpha_s$=constant so chosen that $(\alpha_s a)$ are zero of Bessel function
$J_o$=Bessel function of zero order $$K=\frac{\rho}{\mu}$$

This formula can be found in the text "Operational Methods and Applied Mathematics" by Carslaw and Jaeger, Oxford University Press, 1941.

From the above expression it can be determined that the fundamental time constant is $$\frac{1}{K\alpha_1^2}$$

The first $J_o$ zero $(\alpha_1 a)$ is 2.40. Assume that $a$, the radius of the cylinder is 2.5 mils or $6\times10^{-5}$ meters. Then:

$$\alpha_1=\frac{J_o}{a}=\frac{2.4\times10^5}{6}=4\times10^4$$

$$\alpha_1^2=16\times10^8$$

Further assume that $\rho=50\times10^{-8}$ ohms/meter for a typical magnetic material and $\mu=4\pi\times10^{-7}\times\mu_r$ henries/meter so that:

$$K\alpha_1^2=64\times10^7/\mu_r$$

Therefore:

Time constant $=1/K\alpha_1^2=1.5\times10^{-9}$ seconds for $\mu_r=1$

If $\mu$ relative equals 5,000, a reasonable number, then the $T_c$ becomes 7.5 microseconds. If the duration of the word pulse is 150 ns. and we can expect about .2% of the field to leak through at the end of the pulse we are unsaturated.

If we are unsaturated we expect about all of the field to be passed through in about 2 $T_c$ or 3.0 ns.

While the above description and analysis has been set forth with respect to a plated wire memory element it should be clearly understood that it is equally applicable to planar thin films and other types of thin film memory devices.

While I have described above the principles of my invention in connection with specific apparatus, it is to be clearly understood that this description is made only by way of example, and not as a limitation of the scope of my invention, as set forth in the objects thereof, and in the accompanying claims.

The embodiments of the invention in which an exclusive property or privilege is claimed are defined as follows:

1. A thin film magnetic memory device comprising:
(a) a memory element of magnetizable thin film capable of storing data information;
(b) drive line means disposed adjacent said memory element to subject said memory element to a magnetic field in response to an electrical signal being passed along said drive line;
(c) magnetically-saturable, shield means disposed between said drive line means and said memory element to intercept said magnetic flux from said drive line when said shield is not magnetically saturated and to pass said magnetic flux from said drive line when said shield is magnetically saturated; and (d) signal transfer means connected to said magnetically-saturable, eddy-current shield to pass an electrical signal therealong which generates a magnetic flux to saturate said shield when said flux from said drive line is to be passed through said shield alternatively to not pass said electrical signal thus leaving said shield unsaturated so that said flux from said drive line will be intercepted.

2. A thin film magnetic memory device comprising:
(a) plated wire memory means including a thin film of magnetizable material which is plated to an electrical conducting substrate;
(b) drive line means disposed adjacent said plated wire memory element to subject said plated wire memory element to a magnetic field in response to an electrical signal being passed along said drive line;
(c) magnetically-saturable, shield means disposed between said drive line means and said plated wire memory element to intercept said magnetic flux from said drive line when said shield is not magnetically saturated and to pass such magnetic flux from said drive line when said shield is magnetically saturated; and
(d) signal transfer means connected to said magnetically-saturable, shield means to pass an electrical signal therealong which generates a magnetic flux to saturate said shield when said flux from said drive line is to be passed through said shield, and, alternatively, to not pass said electrical signal therealong thus leaving said shield unsaturated so that said flux from said drive line will be intercepted.

3. A thin film magnetic memory device, comprising:
(a) a plated wire memory element including a thin film of magnetizable material secured to an electrical conducting substrate for storing data information;
(b) drive line means disposed adjacent said plated wire memory element to subject said plated wire memory element to a magnetic field in response to an electrical signal being passed along said drive line;
(c) magnetically-saturable, shield means disposed between said drive line means and said memory element to intercept said magnetic flux from said drive line when said shield is not magnetically saturated and to pass said magnetic flux from said drive line when said shield is not magnetically saturated; and
(d) signal generating means connected to said magnetically-saturable, shield means to generate and transmit an electrical signal therealong which generates a magnetic flux to saturate said shield means when said flux from said drive line is to be passed through said shield means, and, alternatively, to not generate and transmit an electrical signal thus leaving said shield means unsaturated so that said flux from said drive line will be intercepted.

4. A plated wire memory comprising:
(a) a plurality of plated wire memory elements, each including a thin film of magnetizable material secured to an electrically conducting substrate for storing data information;
(b) a plurality of drive line means each disposed adjacent to a plurality of said plated wire memory elements to subject each of said plated wire memory elements to a magnetic field in response to an electrical signal being passed along any one or more of said drive lines;
(c) a plurality of magnetically-saturable, shield means disposed between said plurality of drive line means and associated ones of said plated wire memory elements, each of said magnetically-saturable, shield means acting to intercept said magnetic flux from an associated one or more of said drive lines when said shield is not magnetically saturated and to pass said magnetic flux from an associated one or more of said drive lines when said shield is magnetically saturated; and
(d) selectable signal transfer means connected to said plurality of magnetically-saturable, shield means to selectively pass an electrical signal therealong which generates a magnetic flux to saturate any one or more of said shield when said flux from said drive line is to be passed therethrough, and, alternatively, to selectively inhibit the transmission of an electrical signal therealong thus leaving said shield or shields unsaturated so that said flux from said drive line will be intercepted.

5. A plated wire memory according to claim 4 wherein there is further included selection circuitry connected to said selectable signal transfer means.

6. A plated wire memory device according to claim 5 wherein said selection circuitry is further connected to said plated wire memory elements to selectively provide write current therein and wherein said plated wire memories are further connected to sense amplifiers to respectively sense signals induced therein.

References Cited

UNITED STATES PATENTS

| | | | |
|---|---|---|---|
| 2,820,216 | 1/1958 | Grottrup | 340—174 |
| 3,102,999 | 9/1963 | Bernemyr | 340—174 |
| 3,163,855 | 12/1964 | Bobeck | 340—174 |
| 3,215,991 | 11/1965 | Yamoto et al. | 340—174 |
| 3,235,853 | 2/1966 | Luebbe | 340—174 |
| 3,258,604 | 6/1966 | Anderson | 340—174 X |
| 3,370,281 | 2/1968 | Seki | 340—174 |

OTHER REFERENCES

Publication I: IBM Technical Disclosure Bulletin "Memory Shielding" by Foglia, vol. 5, No. 1, June 1962, pp. 45, 340–174.

STANLEY M. URYNOWICZ, Jr., *Primary Examiner.*